June 6, 1939.   A. E. OSBORN   2,161,310
INDICATOR APPARATUS
Original Filed April 12, 1932   3 Sheets—Sheet 1
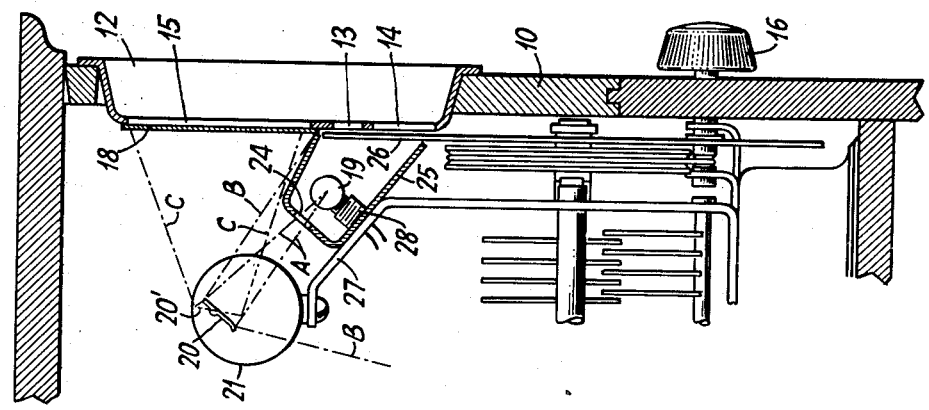
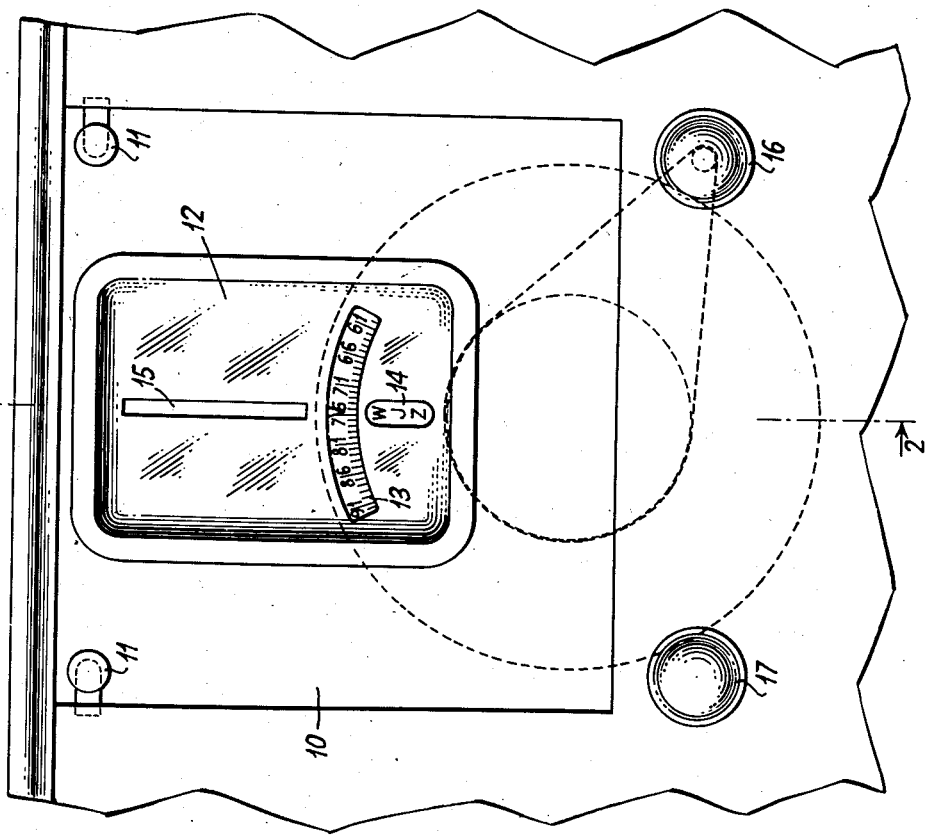
INVENTOR
ALDEN E. OSBORN
BY
ATTORNEY June 6, 1939.　　　A. E. OSBORN　　　2,161,310
INDICATOR APPARATUS
Original Filed April 12, 1932　　3 Sheets-Sheet 2
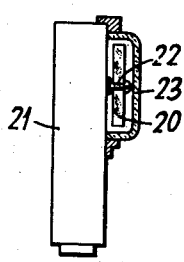
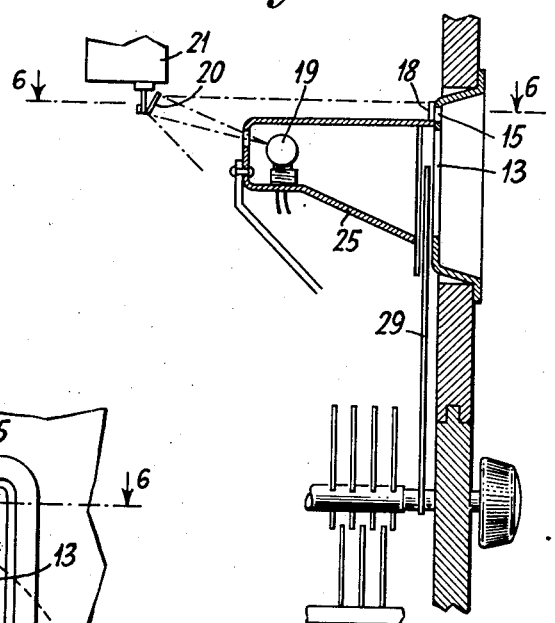
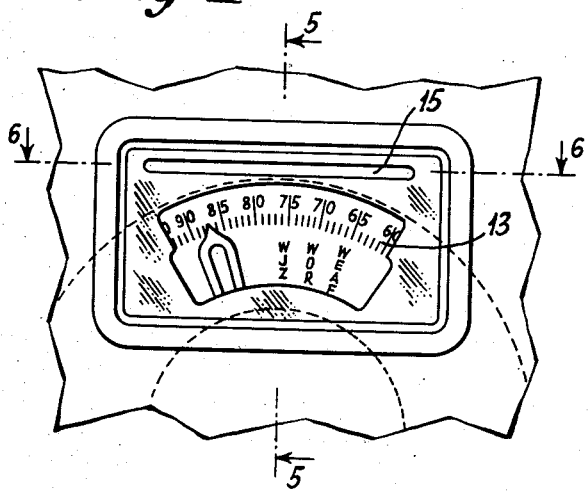
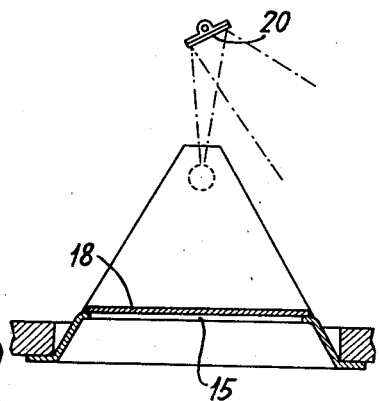
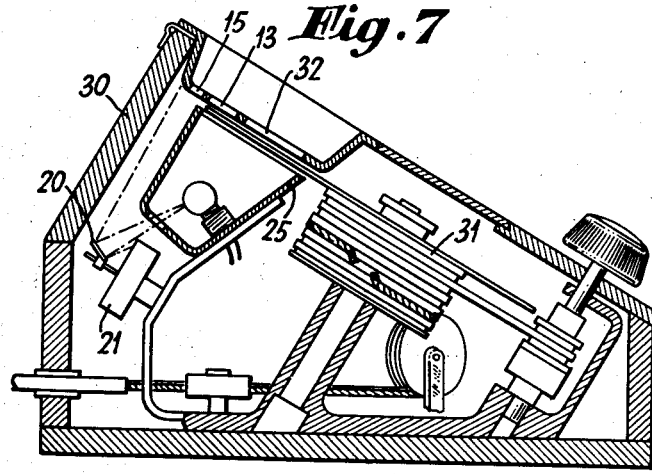
INVENTOR
ALDEN E. OSBORN
BY
ATTORNEY

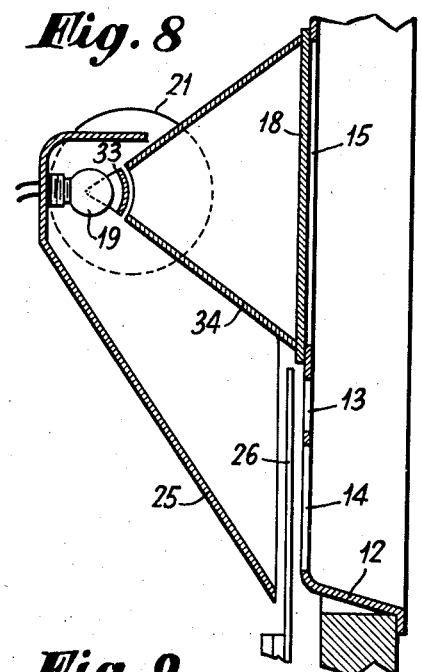
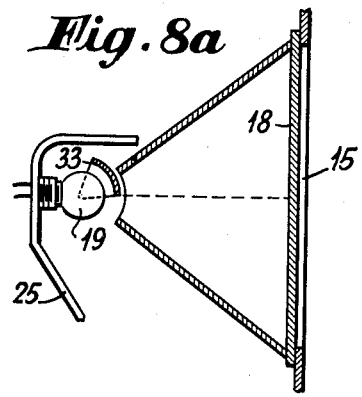
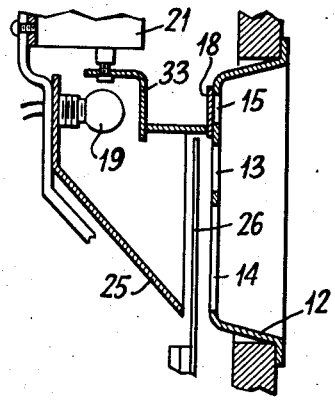
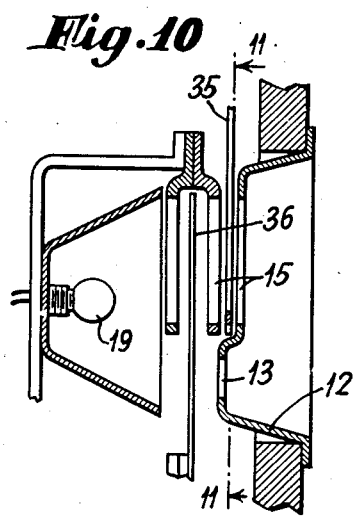
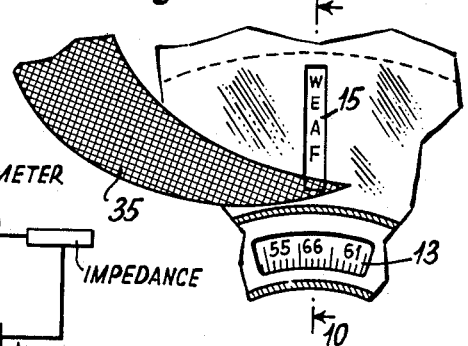
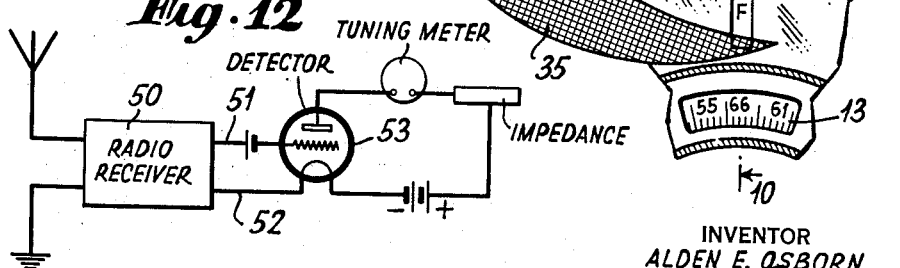

Patented June 6, 1939

2,161,310

UNITED STATES PATENT OFFICE 2,161,310

INDICATOR APPARATUS

Alden Emerson Osborn, New York, N. Y., assignor to Radio Corporation of America, a corporation of Delaware Original application April 12, 1932, Serial No. 604,744. Divided and this application May 5, 1937, Serial No. 140,945

2 Claims. (Cl. 250—40)

This invention relates to automatic indicator apparatus. It is especially applicable to radio receivers and similar devices in which electrical circuits are tuned, usually manually, to the frequency of electrical energy which is to be controlled by the circuits. This application is a division of my copending application, Serial No. 604,744 filed April 12, 1932.

More particularly, the invention relates to apparatus for automatically and visually indicating the station to which a radio receiver is tuned, and the intensity of the energy flow in the receiver at the frequency to which the receiver is tuned. The invention makes possible the successful tuning of radio receivers to the exact frequency of the signal to be received, by noting the visual indicator as distinguished from the usual expedient of listening to the response from the loud speaker and is particularly useful in receivers provided with automatic volume control mechanism and which, therefore, do not lend themselves to accurate tuning by listening to the signal.

A primary object of the invention is to provide improved means for obtaining a visual indication of the energy flow produced in a radio receiver by a received signal, at the frequency to which the receiver is tuned. By noting the visual indication resulting from tuning the receiver through a range of frequencies extending from a frequency somewhat lower than that of the received signal to a frequency somewhat higher, the operator of the radio receiver may pick out the dial position at which the tuned circuits of the receiver are adjusted to exact resonance with the signal.

A more specific object of the invention is to obtain the aforementioned visual indication by providing means for producing a relatively narrow band or beam of light which varies in length or position according to the intensity of the energy flow in part of the receiver circuit. The apparatus is preferably arranged so that the beam of light is directed on a surface located on the front panel of the radio receiver in the vicinity of the usual station indicating scale. The invention, however, may be used with remote control apparatus. The invention is utilized by observing the maximum length of the band or beam of light as the tuning dial of the radio receiver is moved to vary the tuning through a range of frequencies including that of the received signal, and by setting the dial at the point at which the maximum effect is obtained.

Another object of the invention is to obtain the movable band or beam of light either directly or by reflection, from a single stationary source of light.

Another object of the invention is to obtain the movable band or beam of light from a single stationary source which is also the source of light for rendering visible the frequency, wave length or other dial reading used to indicate the station to which the receiver is tuned.

Another object of the invention is to provide a member of relatively small mass arranged to be moved by electrical means and adapted to produce a band or beam of light, the length of which varies over a large range and proportionally to the movement of the member.

These and other objects of the invention which will become apparent upon reading the following specification and appended claims, are attained by controlling a beam of light by means of the energy flow in a part of the receiver circuit such as the plate circuit of the detector tube, which may be the second detector of a superheterodyne receiver. The light is directed or reflected on a translucent surface in such a manner that the position of the tuning elements which produce the greatest energy flow in the radio receiver for any given signal, is readily determined by noting the length of the beam of light, as the tuning elements are moved to vary the frequency through a range of frequencies including that of the signal to be received.

In the accompanying drawings, in which an approved form of the invention and several modifications thereof are illustrated, and in which like reference numerals are used in the several modifications to indicate similar parts;

Fig. 1 is a front view of a portion of the panel of a radio receiver in which the invention has been embodied;

Fig. 2 is a sectional view taken on the line 2—2 of Fig. 1;

Fig. 3 is a side view of a detail of the apparatus shown in Fig. 1;

Fig. 4 is a front view of a portion of the panel of a radio receiver in which a modified form of the invention has been embodied;

Fig. 5 is a sectional view taken on line 5—5 of Fig. 4;

Fig. 6 is a sectional view taken on line 6—6 of Fig. 4;

Fig. 7 is a view, partly in section, of remote control apparatus in which the invention has been embodied;

Fig. 8 is a vertical sectional view of apparatus embodying another modification of the invention;

Fig. 8a shows a different view of the same apparatus;

Fig. 9 is a vertical sectional view of apparatus embodying a modification of the invention similar to the modification illustrated in Fig. 8;

Fig. 10 is a vertical sectional view of apparatus embodying still another modification of the invention;

Fig. 11 is a front view of the apparatus illustrated in Fig. 10, and

Fig. 12 is a schematic circuit diagram of a radio receiver having a tuning meter connected to a detector associated therewith.

Fig. 1 shows a section of the front panel of a radio receiver. The front panel includes a removable portion 10 which may be held in place by a groove at the bottom of the removable portion and suitable locking members 11. The removable portion contains an escutcheon plate 12 provided with an arcuate opening 13 through which the dial readings are observed, a smaller opening 14 through which the station call letters are observed, and an elongated slot or opening 15. In the modification illustrated in Figs. 1 and 2, the slot 15 is arranged vertically and directly over the center of the arcuate opening 13. In some instances however, it may be found desirable to use a horizontal slot, or to provide a curved or arcuate opening or slot in place of the vertical slot. While I have illustrated means for observing both dial readings and station call letters, it is to be understood that either one may be omitted if desired. The portion 10 is made removable to provide access to the station indicator dial and the indicator mechanism. It is removable without disturbing the tuning and volume control knobs 16 and 17.

The elongated slot 15 is fitted with or covered on the back with translucent material 18 such as ground or stained glass, paper, or the like. The glass may be ground or stained and the paper may be colored in any suitable manner.

A varying portion of the translucent material 18 is adapted to be illuminated by light reflected from a bulb 19 by means of a reflector 20. The reflector 20 preferably consists of a small, thin strip of reflecting material such as stainless steel, nickel, or nickel or chrome plated sheet aluminum. In Fig. 2 the reflector is shown slightly curved at one end. This is for the purpose of making the reflected light less dense over a certain area, and for increasing the width of the reflected beam. The reflector is secured to the shaft of a milliammeter 21 by suitable means such as a set screw 22 (Fig. 3). The set screw permits adjustment of the reflector on the shaft.

The reflector 20 may be surrounded by a removable transparent casing 23 as shown in Fig. 3. The casing is provided to protect the reflector from dust and dirt, and to prevent unnecessary tampering with the reflector when the panel portion 10 is removed.

The milliammeter 21 may be connected in various parts of a radio receiver or other apparatus for receiving energy of high frequency modulated at a lower frequency. As one instance of its use, it may be connected in the plate circuit of the tube 16 in Fig. 1 of the patent to Friis, No. 1,675,848, granted July 3, 1928, in series with the resistance 18. When so connected, the larger the received energy on the antenna of the receiver, i. e., the closer the set is tuned to exact resonance with the received signal, the greater will be the current in the plate circuit of the tube 16 and the greater will be the deflection of the mirror and the longer the beam of light produced thereby. The connection of the meter 21 in the plate circuit of a detector tube 53 is illustrated in Fig. 12. In this case the amplified radio frequency output of the receiver is impressed across the cathode and grid of the grid bias detector 53 by the leads 51 and 52. The receiver 50 may be of the superheterodyne type and include a circuit or circuits tunable to the incoming signal frequency, as well known to those skilled in the art.

In certain superheterodyne radio receivers provided with automatic volume control which have been heretofore made and sold, the automatic volume control apparatus serves to make the negative grid bias on one or more radio frequency and one or more intermediate frequency amplifying tubes greater with increase in the strength of the received signal. The greater the negative bias becomes, the smaller the current in the plate circuit. The device of my invention may be employed in the plate circuit of such a radio frequency or intermediate frequency amplifier or in a circuit common to both, and when so used the deflection of the mirror from a preselected zero position, and consequently the length of the beam of light, will be a maximum when the current in the plate circuit is a minimum.

The above examples of possible uses are, of course, intended to be illustrative only, inasmuch as my invention may be applied to radio receivers in many different ways.

As the radio receiver is tuned to an incoming signal, the variation in current flow in the part of the circuit to which the meter is attached actuates the meter so that the reflector is moved in a counterclockwise manner, as viewed in Fig. 2. The reflector is moved to a degree dependent upon the intensity of the current.

When the radio receiver is tuned to the exact frequency of a signal, and the ammeter is connected in the plate circuit of the detector tube (grid bias detector), the current flow actuating the millammeter 21 will have a maximum intensity for that signal and the reflector will be the maximum amount from its zero position, for that particular signal. On the other hand, when the radio receiver is tuned to a frequency slightly above or below the frequency of the signal, the reflector will be moved from its zero position an amount slightly less than when the radio receiver is tuned exactly to the frequency of the signal. When the radio receiver is not tuned to the frequency of a signal of sufficient strength to affect the radio receiver, there is no appreciable current flow in the detector plate circuit and the reflector 20 assumes the position shown by the solid lines in Fig. 2. This position is the zero or inoperative position of the reflector.

The light from the bulb 19 passes through an opening 24 in a casing 25 and falls upon the reflector 20. The path of light from the bulb 19 to the reflector 20 is indicated by the lines A. The light is reflected from the reflector 20 along the path indicated by the lines B when the reflector is in its zero position. It will be seen that when the reflector 20 is in its zero position the reflected light does not fall upon that part of the translucent material 18 which covers the slot 15.

As the tuning dial of the radio receiver is rotated, the resonant frequency of the tuned circuits approaches the frequency of the signal and current flows begin to increase in the plate circuit of the detector tube. This current actuates the meter 21 and causes the reflector 20 to rotate in a counterclockwise manner, as shown in Fig. 2. Just as soon as the reflector is rotated through a very small angle, light is reflected upon the lower end of the strip of translucent material 18. As the angle through which the reflector is rotated increases, the light is reflected on more of the strip of translucent material. From the front of the cabinet the portion of the translucent material illuminated by the reflected light has the appearance of a beam of light of varying height.

When the radio receiver is tuned to resonance with the frequency of the signal, the maximum current flows in the circuits of the radio receiver for that particular signal and the reflector 20 is moved through its maximum angle for that signal. The dotted lines 20' indicate the maximum position which the reflector 20 can assume. This position, however, is not attained for any signal and is only approached when the receiving circuit is in exact resonance with the signal.

When the reflector is in the position indicated at 20' the light from the bulb 19 is reflected along the path indicated by the dotted lines C. The light reflected along the path C illuminates the entire length of the slot 15. When the reflector is in a position intermediate the positions 20 and 20', the lower portion only of the slot is illuminated.

The bulb 19 also provides the source of light for illuminating the dial 26 which is adapted to be seen through the openings 13 and 14. The baffle 25 directs the light against the dial 26. Moreover, it surrounds the bulb 19 in such a manner that light is permitted to reach the reflector 20 only through the small opening 24. The light 19, casing 25 and meter 21 are supported in any suitable manner from a supporting member 27. The supporting member and the casing 25 are preferably provided with a removable portion 28 by means of which the bulb 19 can be removed from the casing 25. The meter 21 is secured to the supporting member by suitable means permitting adjustment of the meter and, consequently, of the reflector.

Figs. 4, 5 and 6 are a front view and two sectional views of a modified form of apparatus embodying the invention. In this modification the slot 15 extends horizontally over the arcuate opening 13 through which the dial readings are observed. The milliammeter 21 is supported by suitable means preferably above the horizontal plane of the slot 15. The shape of the casing 25 is modified slightly, because of the different shape of the arcuate opening.

The reflector 20 is fastened to the shaft of the milliammeter 21 in such manner as to form a slight angle with the shaft in order to direct the reflected light toward the horizontal slot 15.

In this modification I show a fixed scale and a movable needle 29 for indicating the dial readings, in place of the fixed pointer and movable scale shown in Fig. 1. I preferably split the needle as shown in Fig. 4, to provide an opening through which the station call letters may be observed. The milliammeter 21 may be connected so as to move the reflector either in a counter clockwise or in a clockwise manner as shown in Fig. 6. When the milliammeter is connected to rotate the reflector in a clockwise manner as shown in Fig. 6, the beam of light starts at the right hand side of the slot 15 of Figs. 4 and 6 and extends toward the left hand side. If the operation is reversed and the reflector is arranged to be moved in a counter clockwise manner, the beam of light (Fig. 4) will start at the left hand side of the slot and extend toward the right hand side.

Operation of the apparatus, as a whole, is the same as in the modification shown in Figs. 1 and 2.

Fig. 7 illustrates another modification of the invention showing how the visible indicator can be applied to remote control apparatus. The remote control apparatus consists of the housing 30 enclosing control means 31 for controlling the tuning elements in a radio receiver located at a distance from the housing. The control elements have associated therewith the usual indicator disc 32 for showing the station to which the radio receiver is tuned. The source of light 19, the housing 25, the meter 21 and reflector 20 are similar to the corresponding elements shown and described in connection with the previous modifications. The slot 15 is arranged horizontally and immediately over the arcuate opening 13 through which the dial readings are observed. The operation of the apparatus is, in general, the same as in the modification shown in Figs. 1 and 2.

Figs. 8, 9, 10 and 11 illustrate a modification in which the light from the source 19 falls directly upon the translucent material 18 covering the slot 15, instead of being reflected thereupon as in the modification illustrated in Figs. 1 and 2. In the apparatus illustrated by Figs. 8 to 11 a baffle is interposed between the source of light 19 and the slot 15. The baffle is actuated from the shaft of the milliammeter 21 in such a manner that rotation of the shaft moves the baffle and permits more or less light to fall upon the translucent material.

In Figs. 8 and 9 the milliammeter 21 is arranged so that its shaft is directly in line with the bulb 19. The shaft has a baffle 33 directly connected therewith. The baffle has the general shape of a segment of a cylinder. It extends between the bulb 19 and the slot 15. In Fig. 8 the slot 15 is vertical and the shaft of the meter 21 is in the horizontal plane of the light. In Fig. 9 the slot 15 is horizontal and the shaft of the meter 21 is vertically above the light. When the baffle is moved by the meter 21, light from the source 19 enters the casing 34 and is permitted to fall upon and illuminate the translucent material 18 visible through the slot 15. As the angle of rotation of the baffle is increased, more light is permitted to fall on the translucent material. This gives the appearance from the front of the cabinet, of a horizontal beam of light of increasing length. The usual casing 25 is provided for directing the light from the source 19 to illuminate the dial 26. The baffle 33 may be made of any suitable material and shaped in any desired manner. It is usually desirable, however, to make the baffle as light as possible so as to decrease its inertia. Fig. 8a shows how the light falls upon and illuminates the translucent material 18 when the baffle has been moved by the meter 21.

In the modification shown in Figs. 10 and 11 a milliammeter (not shown) moves a crescent shaped baffle 35 between the source of light 19 and the slot 15. In this construction the baffle 35 is made of translucent material, preferably of a different color from the translucent material interposed between the slot 15 and the source of light 19. The effect of the beam of light of increasing length is obtained by rotating the crescent shaped baffle in front of the slot 15. The slot 15 can also be used as the opening through which the station call letters are observed. The call letters are on a dial 36 of semi-transparent material. The dial, in this modification, acts as the translucent material between the source of light 19 and the slot 15.

In another modification of the invention a spot reflector is used in the place of the thin, flat reflector 20 shown in Figs. 2 and 3. For example, the reflector 20 in Fig. 3 may be covered with a non-reflecting substance except for a small spot on the upper end of the reflector. The reflected light thus produced is a spot of light moving up and down the slot 15, in place of the beam of light obtained when the light is reflected from the entire surface of the reflector. Observations are made of the point of light in substantially the same manner as they are made of the beam of light.

While I have explained and described apparatus embodying an approved form of the invention and several modifications thereto, it is to be understood that various other changes and modifications can be made without departing from the spirit of the invention. It is therefore to be understood that the invention is not to be limited to the specific modifications and arrangements shown and described in the foregoing specification, but only by the scope of the appended claims.

Having described my invention, what I desire to secure by Letters Patent is:

1. Indicating apparatus for radio receivers having a front panel provided with a plurality of openings, one serving to give an indication of the exact tuning condition of the receiver, another for indicating the station wave-lengths and a third for indicating the station call-letters, partitions at the upper and lower edges of the first opening extending rearwardly and converging to form a small aperture, a light source positioned rearwardly of and in alignment with said aperture, another partition also converging rearwardly and extending behind the light source, said latter partition and the lower one of the first mentioned partitions forming an enclosure which confines the rays from the light source for illuminating the second and third panel openings, a translucent dial bearing station call-letters and wave-lengths movably mounted to the rear of the second and third openings, an adjustable member interposed between the light source and the aperture formed by the first mentioned partitions, and means responsive to current flow in one of the receiver circuits for controlling the position of said interposed adjustable member whereby varying extents of the first opening may be illuminated, the intensity of the current flow being indicative of the tuning condition of the receiver.

2. Radio apparatus comprising a front panel, an escutcheon plate fitted into the front panel and having therein a pair of aligned vertical slots and an acuate slot arranged between the two vertical slots, a dial member carrying scale readings viewable through the arcuate slot and carrying also station call-letters which are viewable through the lower vertical slot, an enclosure mounted to the rear of said escutcheon plate, a source of light within said enclosure, a partition within said enclosure which divides the light rays from said source into two separate paths, one path illuminating the scale readings and the station call-letters through their respective slots and the second path illuminating the upper vertical slot, adjustable means interposed in the second light ray path and controlled by the flow of current in a portion of the circuit of the radio apparatus, whereby varying lengths of the second vertical slot is illuminated depending upon the intensity of the current flow which is indicative of the tuning condition of the radio apparatus.

ALDEN E. OSBORN.